United States Patent
Traub et al.

(10) Patent No.: US 11,787,325 B2
(45) Date of Patent: Oct. 17, 2023

(54) NATURAL MARKER BASED BOAT LOADING ASSISTANT

(71) Applicants: ZF FRIEDRICHSHAFEN AG, Friedrichshafen (DE); ZF MARINE PROPULSION SYSTEMS MIRAMAR, LLC, Miramar, FL (US)

(72) Inventors: Stefan Traub, Friedrichshafen (DE); Gabriela Jager, Friedrichshafen (DE); Lars Hoffmann, Fort Lauderdale, FL (US); Andrew Orvieto, Plantation, FL (US)

(73) Assignees: ZF Friedrichshafen AG, Friedrichshafen (DE); ZF Marine Propulsion Systems Miramar, LLC, Miramar, FL (US)

(*) Notice: Subject to any disclaimer, the term of this patent is extended or adjusted under 35 U.S.C. 154(b) by 341 days.

(21) Appl. No.: 17/326,859

(22) Filed: May 21, 2021

(65) Prior Publication Data
US 2022/0371503 A1    Nov. 24, 2022

(51) Int. Cl.
*G05D 1/02*    (2020.01)
*B60P 3/10*    (2006.01)
(Continued)

(52) U.S. Cl.
CPC ............ *B60P 3/1075* (2013.01); *B63H 25/04* (2013.01); *G05D 1/0206* (2013.01); *B63H 2025/028* (2013.01)

(58) Field of Classification Search
CPC .............. B63H 25/04; B63H 2025/028; G05D 1/0206; B60P 3/1075; B63B 49/00
See application file for complete search history.

(56) References Cited

U.S. PATENT DOCUMENTS 3,447,815 A * 6/1969 West .................... B60P 3/1075
                                                          280/145
3,720,967 A * 3/1973 Rice ..................... B60P 3/1033
                                                          114/344
(Continued)

FOREIGN PATENT DOCUMENTS

DE    20 2019 218 929 A1    6/2021
DE    10 2020 201 785 A1    8/2021

OTHER PUBLICATIONS

Higinbotham et al., Update on the development and testing of a new long duration solar powered autonomous surface vehicle, 2008 , IEEE, p. 1-10 (Year: 2008).*

(Continued)

*Primary Examiner* — McDieunel Marc
(74) *Attorney, Agent, or Firm* — Finch & Maloney PLLC

(57) ABSTRACT

A navigational system for guiding a boat onto a trailer comprising at least a portion of a tow vehicle which forms a natural marker for the navigation system. A camera is located on the boat to assist the navigational system with aligning a longitudinal axis of the boat with a longitudinal axis of the trailer. A central vertical (mid) axis of the camera is aligned with the longitudinal axis of the boat. An image processing unit receives and processes images from the camera. The image processing unit, based upon a determination of a position of the central vertical (mid) axis of the camera relative to a target area of the detected natural marker, generating guidance commands to assist a user with alignment of the longitudinal axis of the boat with the longitudinal axis of the trailer and thereby facilitate proper loading of the boat onto the trailer.

20 Claims, 6 Drawing Sheets

(51) Int. Cl.
*B63H 25/04* (2006.01)
*B63H 25/02* (2006.01)

(56) References Cited

U.S. PATENT DOCUMENTS

| | | | | |
|---|---|---|---|---|
| 4,011,958 | A | * | 3/1977 | Carrick ................. B60P 3/1033 |
| | | | | 114/344 |
| 4,114,920 | A | * | 9/1978 | Boettcher ............. B60P 3/1033 |
| | | | | 414/529 |
| 4,429,893 | A | * | 2/1984 | Palamara .............. B60P 3/1066 |
| | | | | 414/559 |
| 10,011,211 | B1 | | 7/2018 | Gutierrez et al. |
| 2009/0302572 | A1 | * | 12/2009 | Bryant, II ............. B60P 3/1075 |
| | | | | 414/532 |
| 2016/0264220 | A1 | | 9/2016 | Aceky et al. |
| 2016/0368578 | A1 | | 12/2016 | Walke |
| 2018/0050772 | A1 | | 2/2018 | Koyano et al. |

OTHER PUBLICATIONS

Paulos et al., Automated Self-Assembly of Large Maritime Structures by a Team of Robotic Boats, 2015, IEEE, p. 958-968 (Year: 2015).*

Wiki.ros.org/aruco_mapping; at least as early as Oct. 10, 2015 See Spc., p. 2.

* cited by examiner

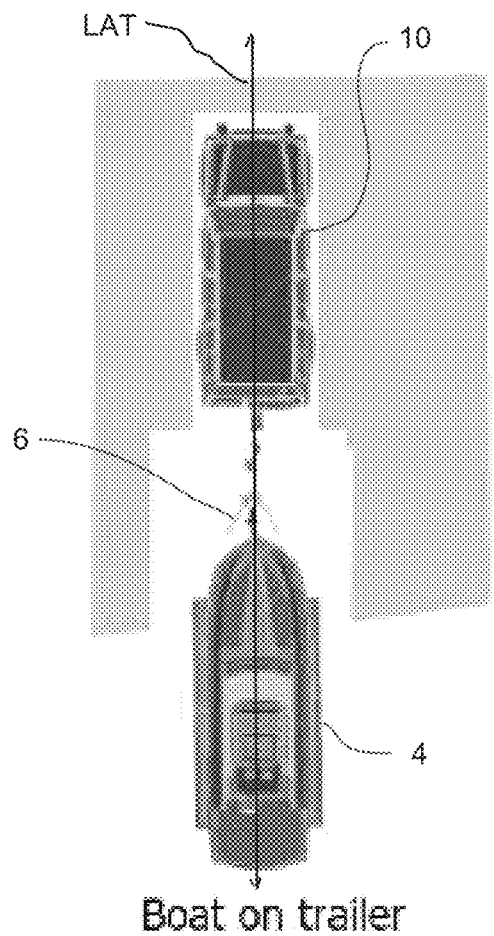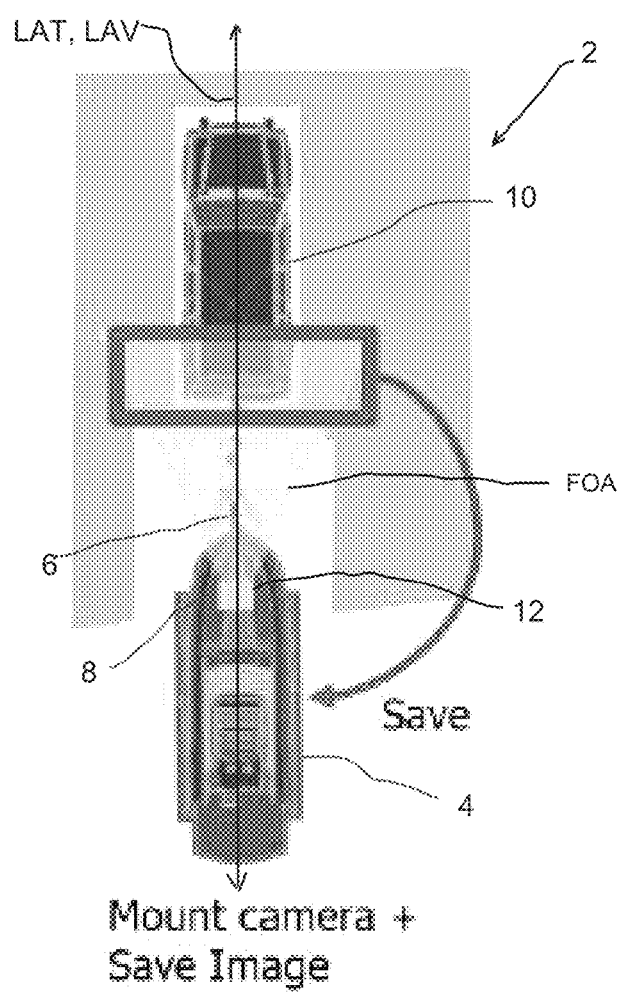
Fig. 1
Fig. 2

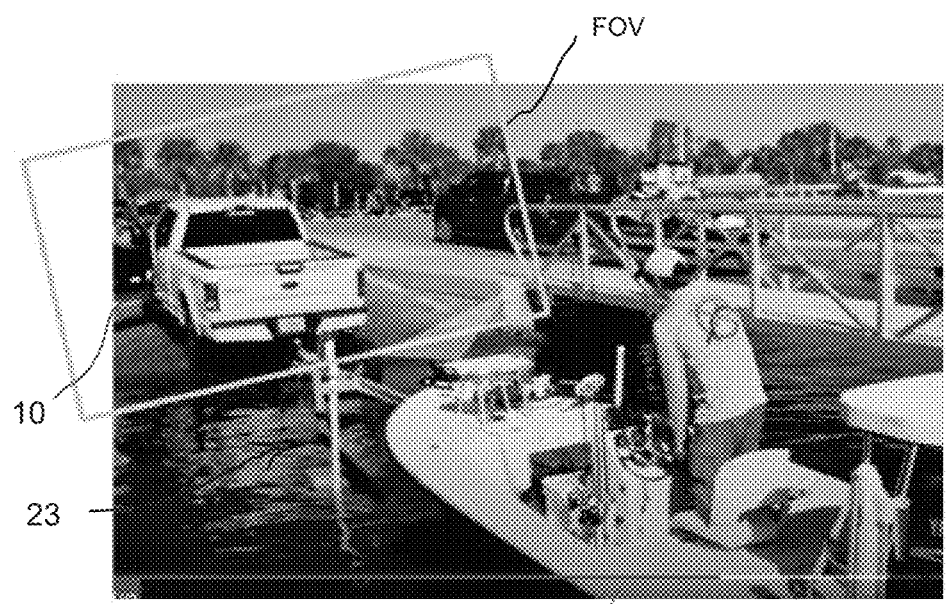
Fig. 6
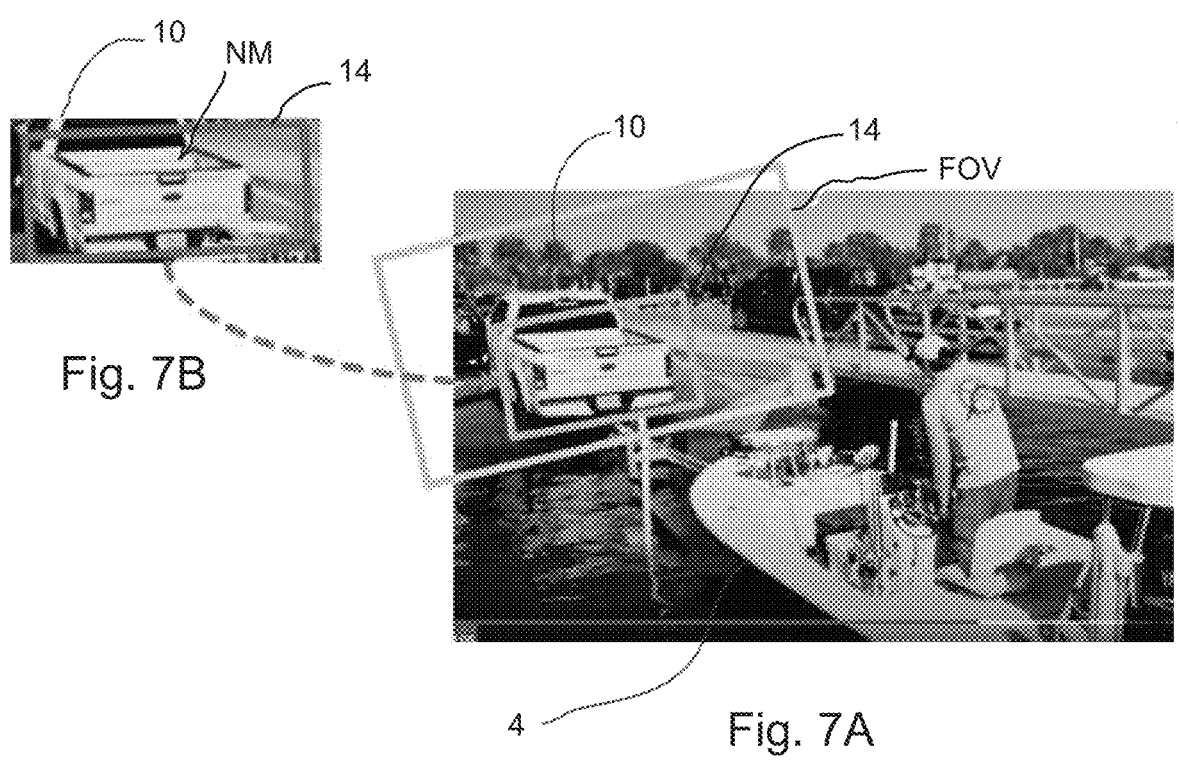
Fig. 7B
Fig. 7A

NATURAL MARKER BASED BOAT LOADING ASSISTANT

FIELD OF THE INVENTION

This present invention generally relates to navigation, and more particularly to a system and a method which include a mobile device that records a loading/unloading process of a vehicle or vessel, such as a boat, and, thereafter, assists the user with properly aligning the vehicle or vessel with an associated trailer as the vehicle or vessel approaches the trailer to facilitate safe and accurate loading of the vehicle or vessel on the trailer for subsequent transport and/or storage of the same on the trailer.

BACKGROUND OF THE INVENTION

It is known that loading of a vehicle, such as a boat, onto a trailer may be difficult, given the variability in ramp dimensions (i.e., the ramp length, the ramp width, the ramp inclination, etc.), the wind speed and the wind direction, the current wave conditions as well as the navigational skill of the operator of the vehicle.

In addition, boat ramps are frequently crowded with boaters facing substantial waiting times for access to the boat ramp in order to permit the boater to load or unload his/her boat on a trailer at the boat ramp. Such loading and unloading situations are often high pressure in nature since each operator, when his/her turn comes to launch or retrieve his/her vessel, tries to load/unload the vessel as quickly and efficiently as possible so as not to further hold up the boat loading/unloading queue at the boat ramp.

Further compounding the loading/unloading process is that boats are frequently loaded/unloaded from a trailer by a single operator, with no additional guidance or assistance from any other individual during the entire loading/unloading process.

Moreover, it is to be appreciated that damage may possibly occur, particularly during the boat loading process, to either the boat, the trailer, or both, or possibly damage may occur to a tow vehicle, e.g., a car or a truck, from being driven too far down the loading ramp so as to be unacceptably partially submerged in the water. It is to be appreciated that such dam age can be very costly to repair and is generally to be avoided.

While the above noted problems more often occur to individuals who are relatively new to boating and/or are generally inexperienced or have a lack of adequate training and/or skill, it is to be appreciated that even an experienced operator may also have difficulty loading a boat on a trailer and/or an increased risk of causing damage to the boat and/or the trailer during a single person loading/unloading operation.

In view of the above drawbacks associated with the prior art loading/unloading techniques and operations, it would be beneficial for an operator to have a system which would consistently and reliably assist the operator with safely and efficiently guiding his/her boat, toward the associated trailer, and properly aligning and loading the boat on the trailer during the first loading attempt.

It is noted that a few prior inventions have proposed some solutions to the above noted problems. For example, a conventional marker-based navigation is described at http://wiki.ros.org/aruco mapping.

The Applicant also recently filed a few patent applications relating to marker-based navigation. For example, DE 202466D relates to a method for controlling a vehicle which has at least one environment sensor; with the steps of recognizing the one or more markings, each of which is assigned a priority, in a sensor image; checking whether the marking with the highest priority is to be assigned to a left or a right part of the sensor image; steering the vehicle to the left when the marker is attributable to the left part; and steering the vehicle to the right when the marker is attributable to the right part. In additional, DE 204659D relates to a method for controlling a vehicle which has at least one environment sensor with the steps of recognizing one or more markings, each of which is assigned a priority and at least one location, in a sensor image; for determining the marker with the highest priority; and controlling the vehicle in the direction of a location determined by the location information assigned to the marking with the highest priority.

Also known is U.S. Publication No. US2016/0264220 relates to a system and method for assisting with the loading of a boat at a desired parking target, such as boat trailer or dock. In one example, a light source is provided on a boat trailer to illuminate the trailer. A forward facing camera and corresponding monitor are provided on a boat. As the boat approaches the boat trailer, the light source makes the boat trailer more visible, especially in low light conditions. The light source is also visible on the monitor, making it easier for a boat operator to guide the boat to the trailer.

U.S. Publication No. US2016/0368578 relates to a method and apparatus using a camera and image display for improving navigation of the watercraft. The system may be used by a helmsman to view regions outside his/her unaided sight range. Objects ahead of and behind the watercraft, both above and beneath the surface, may be detected and navigation decisions are made thereby. The same method and apparatus may be used to improve viewing while backing a trailer. In any event, the images may be recorded for later viewing.

U.S. Pat. No. 10,011,211 relates to a trajectory module which is configured to determine a trajectory of a boat located in water behind a trailer that is hitched to a vehicle based on an image behind the vehicle captured using a rear facing camera of the vehicle. An illuminating module is configured to turn a right brake light of the vehicle ON and OFF when the trajectory of the boat is left of a longitudinal axis of the trailer and to turn a left brake light of the vehicle ON and OFF when the trajectory of the boat is right of the longitudinal axis of the trailer.

SUMMARY OF THE INVENTION

Wherefore, it is an object of the present invention to overcome the abovementioned shortcomings and drawbacks associated with the prior art loading and unloading techniques and processes.

The present disclosure relates to a navigation system and method embodying the invention includes a mobile device which communicates with a camera. The camera is typically mounted toward the bow region of the boat or may possibly be held by the user, but this tends to be less accurate. The navigation system uses the camera and the image processing unit to determine whether or not the longitudinal axis of the boat is currently aligned with the longitudinal axis of the trailer in order to assist with safely and efficiently load the boat onto the trailer.

The navigation system utilizes the (main) display screen of a mobile device to display a current image of the boat loading process, obtained by the camera, and informs the user, via an overlay display (e.g., overlaid images, augmented reality acoustics signal or vibrations) which is displayed on a display screen, over a current image of the boat loading process, to provide a visual indication to the user (boat operator) relating to how closely the longitudinal axis of the boat is in alignment with the longitudinal axis of the trailer in order to assist the user with safely and efficiently load the boat onto the trailer.

During a boat loading operation, the navigation system determines if the longitudinal axis of the boat is aligned with the longitudinal axis of the trailer and generates guidance output commands to the boat operator, e.g., recommends to the boat operator to maintain the current course, or possibly does not provide any recommendation, when the navigation system determines that the longitudinal axis of the boat is aligned with the longitudinal axis of the trailer. When the boat is straying from the desired alignment, the navigation system generates one or more guidance output commands to the user (boat operator), e.g., to turn toward the port (left) side or to turn toward the starboard (right) side, until the longitudinal axis of the boat is again back in alignment with the trailer. Such commands thereby assist the user (boat operator) with safely and efficiently loading the boat on the associated trailer.

According to one variant of the disclosure, the navigation system will generate an optional overlay, in a real-time view looking forward from the boat, displaying the current alignment of the longitudinal axis of the boat with the longitudinal axis of the trailer, over a current image generated by the camera, in order to assist the boat operator with safely and efficiently loading the boat on the associated trailer.

During operation of the navigation system, the camera is continuously viewing and inputting images to the image processing unit of the navigation system, and the navigation system then processes such received images by analyzing the inputted images to detect the natural marker and the relative alignment of the boat longitudinal axis with the trailer longitudinal axis to assist the user (boat operator) with safely and efficiently loading the boat on the associated trailer.

The disclosure further relates to a navigational system for guiding a boat onto a trailer, the navigational system comprising: at least a portion of one of a tow vehicle forming a natural marker of the navigation system to assist the navigational system with loading the boat onto the trailer; a camera being located on the boat to assist the navigational system with aligning a longitudinal axis of the boat with a longitudinal axis of the trailer, a central vertical (mid) axis of the camera being aligned with the longitudinal axis of the boat, and the camera being located so as to generate images of at least the tow vehicle, during a boat loading process, for detection of the natural marker; an image processing unit, coupled to the camera, for receiving and processing the images from the camera and scanning the images for detecting the natural marker, and, upon detecting the natural marker, determining a target area of the detected natural marker, and the image processing unit then determining whether or not the central vertical (mid) axis of the camera is substantially coincident with the target area of the detected natural marker; and the image processing unit, based upon the determined position of the central vertical (mid) axis of the camera relative to the target area of the detected natural marker, generating guidance commands to assist a user with alignment of the longitudinal axis of the boat with the longitudinal axis of the trailer and thereby facilitate loading of the boat on the trailer.

The disclosure further relates to a method of guiding a boat onto a trailer, the method comprising: using at least a portion of one of at least a tow vehicle to form a natural marker of the navigation system and assist the navigational system with loading the boat onto the trailer; locating a camera on the boat to assist the navigational system with aligning a longitudinal axis of the boat with a longitudinal axis of the trailer, aligning a central vertical (mid) axis of the camera with the longitudinal axis of the boat, and locating the camera so as to generate images of at least one of the tow vehicle and the trailer, during a boat loading process, to assist with detecting the natural marker; coupling an image processing unit to the camera for receiving and processing images from the camera and scanning for the natural marker and, upon the image processing unit detecting the natural marker, determining a target area of the detected natural marker, and then the image processing unit determining whether or not the central vertical (mid) axis of the camera is coincident with the target area of the detected natural marker; and based upon the determination position of the central vertical (mid) axis of the camera relative to the target area of the detected natural marker, the image processing unit generating guidance commands to assist a user with aligning the longitudinal axis of the boat with the longitudinal axis of the trailer.

BRIEF DESCRIPTION OF THE DRAWINGS

The accompanying drawings, which are incorporated in and constitute a part of the specification, illustrate various embodiments of the disclosure and together with the general description of the disclosure given above and the detailed description of the drawings given below, serve to explain the principles of the disclosure. The disclosure of the invention will now be described, by way of example, with reference to the accompanying drawings in which:

FIG. 1 is a diagrammatic top plan view a boat loaded on a trailer coupled to a tow vehicle, according to the disclosure, prior to installation of a recording camera on the boat;

FIG. 2 is a diagrammatic top plan view of the boat loaded on the trailer and coupled to the tow vehicle, similar to FIG. 1, but after the camera is secured to the boat for recording the boat loading/unloading process, with the natural marker of the tow vehicle and the trailer being located within the field of view of the camera;

FIG. 6 is a diagrammatic representation of the navigation system showing the field of view of the camera in which the processing unit will search for the natural marker;

FIG. 7A is a diagrammatic view, similar to FIG. 6, showing the field of view of the camera (the larger rectangle) and the detected natural marker of at least the tow vehicle (smaller rectangle) of the navigational system and method according to the disclosure;

FIG. 7B is an enlarged view of FIG. 7A showing the features of at least the tow vehicle, detected by the camera, which forms the detected natural marker;

Figures 3, 4:
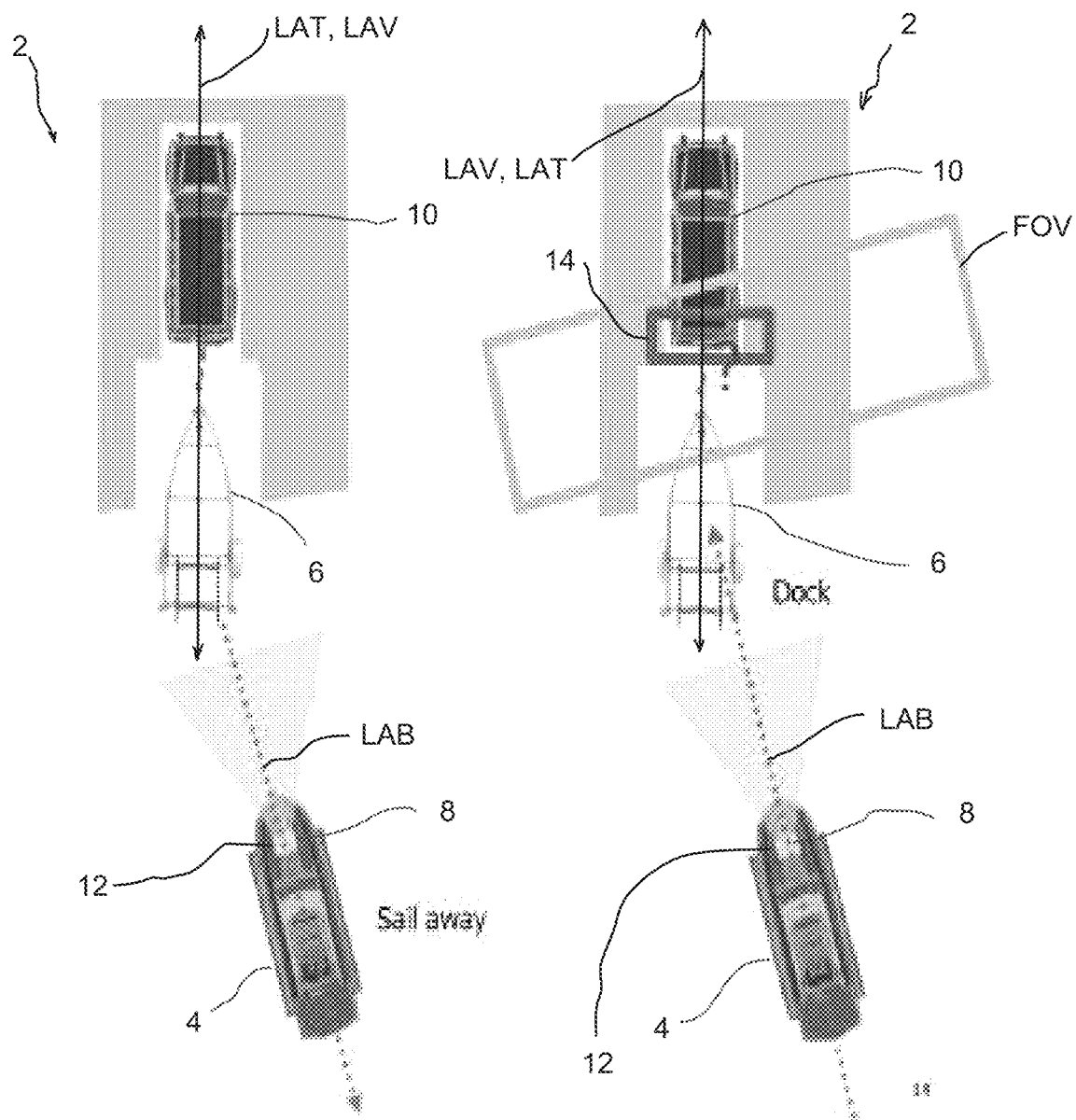
FIG. 3 is a diagrammatic top plan view, similar to FIG. 2, but with the boat unloaded from and sailing away from the trailer and the tow vehicle while the camera is still recording the unloading process so as to gathering images of the natural marker of the tow vehicle and the trailer at different distances and angles.
FIG. 4 is a diagrammatic top plan view, similar to FIG. 3, showing the boat generally located at a position for commencing the boat loading process on the trailer which is coupled to the tow vehicle and located on the boat ramp with the field of view of the camera being depicted by the larger rectangle and the natural marker of the tow vehicle and possibly a portion of the trailer being depicted by the smaller rectangle.
Figures 5A, 5B:
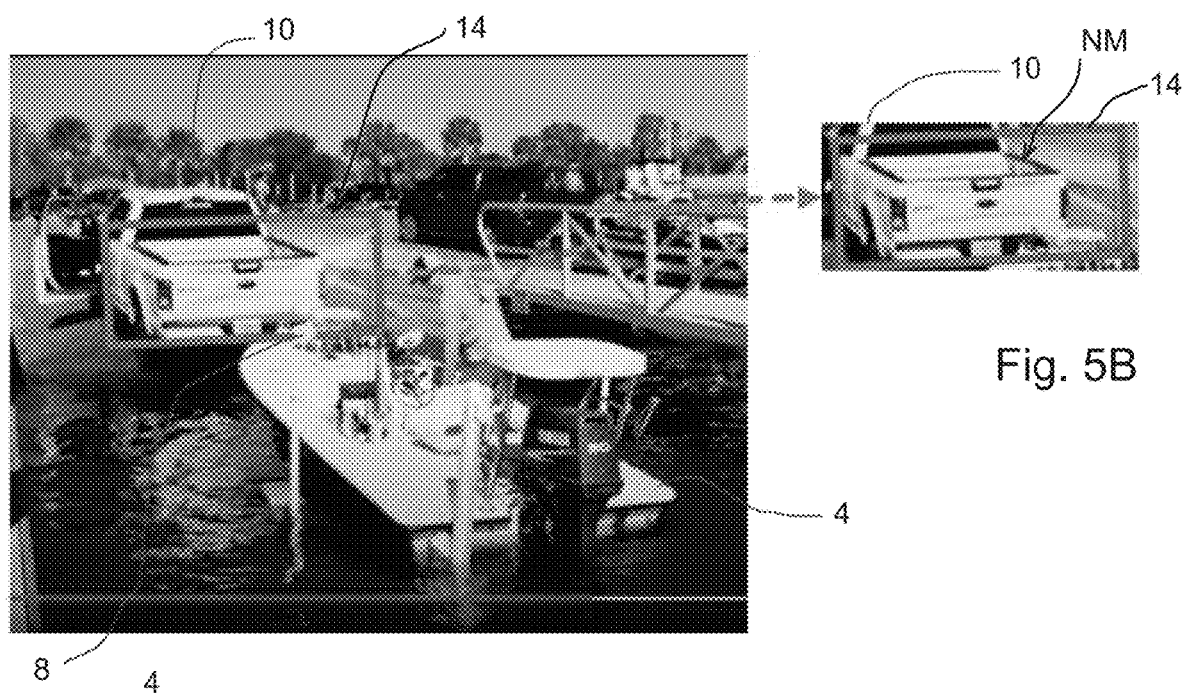
FIG. 5A is a diagrammatic view showing the camera, prior to launching, learning the position of the boat relative to the trailer and the tow vehicle, i.e., learning the natural marker of the tow vehicle and possibly a portion of the trailer, and processing of the same by the navigational system and method according to the disclosure.
FIG. 5B is an enlarged view of FIG. 5A showing the features of at least the tow vehicle, detected by the camera, which forms the detected natural marker.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION OF THE PREFERRED EMBODIMENTS

An example of a boat loading/unloading navigation system and method 2, embodying the invention as generally shown in Figures, will now be described in detail. As generally shown, the navigation system and method 2 comprise a vehicle, a vessel or a boat 4 (hereinafter generically referred to as a "boat"), an associated trailer 6 upon which the boat 4 is to be loaded, a mobile device 8, e.g., a smart phone, a tablet, a laptop, etc., associated with the boat 4 for guiding the boat 4 onto the associated trailer 6, and a camera 12 for viewing the loading operation from a vantage point on the boat (see FIGS. 2-5A, for example). As is conventional in the art, the associated trailer 6 is towed by an associated conventional towing vehicle 10. According to the present disclosure, the rear area of the towing vehicle 10, e.g., a tailgate and rear window, a trunk and rear window, etc., and possibly a portion of the trailer 6, e.g., a wench post of the trailer, will serve as a "natural marker" NM which is to be detected and utilized by the navigation system and method 2 for aligning or maintaining the boat longitudinal axis LAB in alignment with the trailer longitudinal axis LAT during the boat loading process, as discussed below in further detail.

Prior to use of the navigation system and method 2, if not already preloaded the user's mobile device 8, the user will visit a conventional "App Store" and search for the trailer loading/unloading assist software, i.e., the App, and, thereafter, download the same on the user's mobile device 8. Once this has occurred, the user will then launch the App on his/her mobile device 8. After launching the App, the App may prompt the user to either enter the manufacturer, the model, and the year of manufacture of the boat 4 and also may request the user to select or verify the trailer 6, e.g., the manufacturer, the model, etc., upon which the boat 4 is to be loaded/unloaded. Next, the App will typically check to confirm that the boat 4 can be properly and safely loaded/unloaded on and off the selected trailer 6. Assuming that the selected boat 4 can be properly loaded/unloaded from the selected trailer 6, then the preloaded information, previously stored within the App, e.g., the length and the width of the boat, the length and the width of the trailer, type of trailer bunk, etc., concerning both the selected boat 4 as well as the selected trailer 6, are typically saved and stored in memory and the App files are then correspondingly configured for use during operation.

However, in the event that the App determines that the boat cannot be properly loaded on the selected trailer 6, then a suitable warning, e.g., "this boat is not designed for safe loading on this trailer", or some other similar message will be generated by the App and displayed. This warning is typically displayed on the (main) display screen 24 of the mobile device 8.

It is to be appreciated that a wireless camera may possibly be utilized by the navigation system and method 2, for some applications, instead of the integrated camera 12 of the mobile device 8. In the event that a wireless camera 12 is utilized, the wireless camera 12 is typically mounted to the boat 4, normally adjacent or within the bow area, and the wireless camera 12 will communicate wirelessly, e.g., by Bluetooth® technology, with the internal processor of the mobile device 8, or an ECU or some other processing unit, for sending images thereto for processing, during use of the navigation system and method 2, as discussed below in further detail. In either event, either the integrated camera 12 of the mobile device 8 or the wireless camera 12 is typically mounted, via a (fixed or pivotable) camera bracket 16, along a longitudinal axis of the boat LAB for viewing at least an area in front of the boat 4. It is to be appreciated that the camera 12 may possibly be mounted offset with respect to the longitudinal axis of the boat LAB.

Throughout this disclosure, reference is made to the camera 12. It is to be appreciated that all such references are intended to cover both a wireless camera 12 as well as a camera 12 integrated as part of the mobile device 8.

Once the mobile device 8 is set up for use, the camera 12 may be releasably mounted, via the camera bracket 16, to the windscreen or some other component of the vessel, for example, or may possibly be supported or held at some other conventional navigational and vantage point of the operator of the boat. The camera 12 is typically located a few feet or so vertically above a top perimeter edge of the bow of the boat and typically near the helm and generally along or adjacent the longitudinal axis of the boat LAB. Preferably, the camera 12 is secured along the longitudinal axis of the boat LAB. The camera bracket 16 may be mount to the windshield or to a console of the boat, for example, and is typically designed to support the wireless camera 12 or the mobile device 8 having an integrated camera 12 about its perimeter edge, without blocking or hindering the field of view F of the camera 12 of the mobile device 8, while, at the same time, still permitting view of the (main) display screen 24 of the mobile device 8 by the user of the App. The camera 12 must be mounted so as to be forward facing, i.e., with up to 5° yaw (roll and pitch are typically not relevant) such that at least the tow vehicle 10 would normally be visible within the field of view FOV of the camera 12, both prior to launching the boat 4 from the trailer 6 and as the boat 4 approaches the trailer 6 during loading.

As noted above, possibly the mobile device 8 with the integrated camera 12 may be held by in a hand(s) of the user, but such hand-held use of the mobile device 8, running the App, is typically somewhat less accurate, due to movement of the mobile device 8 and camera 12, relative to the boat 4, during a loading operation. In addition, such hand-held use may also hinder the ability of the user to safely maneuver the boat 4, during the loading operation, while also holding the mobile device 8 in his/her hand(s).

As noted above, the camera bracket 16 must be mounted to the boat at a sufficiently high vantage point on the boat (or possibly being hand held by the user) so that the camera 12 is able to view desired features of at least a rear portion of the tow vehicle 10 and possibly at least a portion of the trailer 6, e.g., the wench, which may possibly also comprise the natural marker NM, as the boat 4 approaches the trailer 6 for loading. Typically, a portion of the water 23, located between the boat 4 and the associated trailer 6 upon which the boat is to loaded, generally falls within the field of view FOV of the camera 12, as the boat 4 approaches the trailer 6 during the loading process.

During the initial set-up of the camera 12, the user optionally adjusts the camera 12, relative to the longitudinal axis of the boat LAB, so that a middle line or a central vertical (mid) axis VA, which divides the field of view of the camera 12 into equal left and right halves fields of view LH, RH, is generally coincident with the longitudinal axis of the boat LAB. The user will adjust the field of view of the camera 12 until equal left and right halves fields of view LH, RH are achieved, i.e., the middle line or the central vertical (mid) axis VA of the camera 12 is coincident with the longitudinal axis of the boat LAB. Once the camera 12 is installed, properly adjusted and secure to the camera bracket 16 so as to maintain continuously that installed position during the entire boat unloading process as well as the entire boat loading process, the App is then ready to commence recording of the boat unloading process.

It is to be appreciated that the mounting bracket 16 may possibly be equipped with conventional fine tuning adjustments to assist the user with aligning the middle line or central vertical (mid) axis VA of the camera 12 so as to be coincident with the longitudinal axis of the boat LAB. In addition, the App may typically have an adjustment feature which permits the user to adjust the overall size of the target box overlay 14, i.e., the overlay box height and width, to be increased or decreased in size and thereby to increase or decrease the features that the navigation system and method 2 will be scanning for and subsequently using to identify as the natural marker NM. This is, the features located within the target box overlay 14, e.g., the rear portion of the tow vehicle 10 and/or possibly a portion of the trailer 6, will comprise the natural marker NM of the navigation system and method 2.

As noted above, it is conceivable that the mobile device 8 with the integrated camera 12 may possibly be hand-held by the user, however, it is important that the camera 12 must be located, in substantially the same location and orientation, during the entire boat unloading process as well as during the entire boat loading process.

According to one embodiment of the disclosure, the camera 12 may be equipped with image stabilizing technology which minimizes, to the extent possible, the side to side and up and down motion of the camera 12 which may be induced by wave action experienced by the boat 4 during the unloading and the loading process. Alternatively, or in addition thereto, the mounting bracket 16 may include technology which is designed to minimize or absorb motion and thereby maintain the camera 12 in a substantial vertical orientation so as to reduce the effects of wave action on the camera 12 during the unloading and the loading process.

Prior to unloading the boat 4, the user, or some other operator of the tow vehicle 10, must first ensure that the longitudinal axis of the trailer LAT is substantially aligned with the longitudinal axis of the tow vehicle LAV (see FIG. 1 for example) as this is an important assumption that is being made by the navigation system and method 2 according to the disclosure. In addition, during the subsequent boat loading operation, it is also important that the longitudinal axis of the trailer LAT be again substantially aligned with the longitudinal axis of the tow vehicle LAV (see FIG. 4 for example).

As indicated above, the camera 12 is mounted generally toward the front area of the boat 4 and along, or close to but offset from, the longitudinal axis of the boat LAB. Since the boat 4 is still on the trailer 6 (see FIGS. 5A and 5B for example), at least the top and rear portion of the towing vehicle 10 as well as the background scenery and sky and possibly the wench post of the trailer 6 fall within the field of view FOV of the camera 12. As noted above, the App is typically equipped with an adjustment feature which permits the overall size of the target box overlay 14 to be varied and thereby increase or decrease the features that the navigation system and method 2 will be scanning for and subsequently using to identify as the natural marker NM. While the target box overlay 14 is generally depicted as having a rectangular shape, it is to be appreciated that the target box overlay 14 can have a variety of other desired shapes and/or sizes, without departing from the spirit and scope of the present disclosure.

In addition, the navigation system and method 2 will generate and display a target area overlay 15 (an oval overlay in this embodiment but it is to be appreciated that the overall shape and size of the target area overlay 15 can vary from one application to another). The target area overlay 15 typically overlays a central target area of the natural marker NM which is located within and defined by the target box overlay 14. This target area overlay 15 will be used, by the navigation system and method 2, as a target area for aiming and alignment with the middle line or central vertical (mid) axis VA of the camera 12, as described below in further detail.

During the unloading process, the user initiates a recording process of the App and also start the motor of the boat 4, if it this not currently running. Thereafter, the user commences a reverse direction of travel of the boat 4 in order to launch the boat 4 from the trailer 6. The boat 4 will then gradually separate from the associated trailer 6 and enter the water and commences floating and traveling away from the trailer 6. As this occurs, a greater portion of the trailer 6 is gradually viewable within the field FOV of view of the camera 12 and, thereafter, the water 23 will eventually become visible within the field of view FOV of the camera 12. As such unloading operation progresses, the boat 4 continues to sail/motor away from the trailer 6 in a reverse direction of travel, as generally shown in FIG. 3. The navigation system and method 2 will continue recording the unloading process of the boat 4 until the boat 4 is located a desired distance away from the trailer 6, for example, at least 20 to 200 feet or so away from the trailer 6.

During the unloading process, the navigation system and method 2 collect various images of the features, which are located within the target box overlay 14 and form the natural marker NM, at a variety of different distances and angles away from the trailer 6. This information assists the navigation system and method 2 with learning to identified the features which are located within the target box overlay 14 and form the natural marker NM. Once the boat 4 is a sufficient distance away from the trailer 6, the recording function is discontinued by the user and the precise GPS coordinates or location of the boat 4, at the time that recording process terminates, is determined and stored by the navigation system and method 2 for subsequent use.

During the recording process, the navigation system and method 2 scans the imputed images and seeks to identify and learn those features of the tow vehicle 10, for example, which are located within the target box overlay 14 so as to, thereafter, be able to identify such features as the natural marker NM when the boat 4 is located at variety of different distances and/or angles away from the trailer 6. During recordation of the unloading process, the navigation system and method 2 is supplied with a plurality of different images of the rear portion of the towing vehicle 10 as well as any visible portion of the trailer 6. These different images are collected at different distances as away from the trailer 6 and generally are at different angles as well. Such different views and different angles assist the navigation system and method 2 with learning to identify the features which form the natural mark NM.

Thereafter, the user will then perform the desired boating activities on the body of water. Once the desired boating activities are completed, the user will then return the boat 4 back to the boat loading area for loading the boat 4. Next, the user, or some other individual associated with the user, will enter the tow vehicle 10 and reposition the tow vehicle 10 and the trailer 6 back on the boat loading ramp until a portion of the trailer 6 is sufficiently submerged within the water so as to permit proper loading of the boat 4 thereon As noted above, during the boat loading process, the longitudinal axis of the trailer LAT again must be substantially axially aligned with the longitudinal axis of the tow vehicle LAV (see FIG. 4, for example).

Once the trailer 6 is suitably located on the boat loading ramp for loading, the user will then position the boat 4 in the vicinity of where recording of the unloading process terminated. The App can assist the user with navigating the boat 4 back to the same GPS coordinates, which were previously saved by the navigational system and method 2 upon termination of previous recording function, and with the boat 4 facing and headed toward the trailer 6 for loading. The user then continues traveling in the direction of the trailer 6 for loading the boat 4 and ensure that the longitudinal axis of the boat LAB is visually aligned with the longitudinal axis of the trailer LAT.

Upon activation during the boat loading process, the navigational system and method 2 commences receiving images, from the camera 12, and send such images to the image processing unit 32 for processing. During processing by the image processing unit 32, the navigational system and method 2 will first scan each image looking for features, in the image currently being processed, which comprise the learned natural marker NM. Once the learned natural marker NM is detected, the navigational system and method 2 will superimpose the target box overlay 14, along with the target area overlay 15, over the detected natural mark NM in the image just processed. After this occurs, the navigational system and method 2 will then determine the position of the middle line or central vertical (mid) axis VA of the camera 12, i.e., the longitudinal axis of the boat LOB, relative to the target area overlay 15 superimposed over the determined natural marker NM (see FIGS. 8 and 9 for example).

Based upon such analysis, the image processing unit 32 will then generate any necessary guidance commands, e.g., continue straight ahead travel (see FIG. 11), turn toward the port (left) side (see FIG. 10), turn toward the starboard (right) side, etc., in order to assist the user of the boat 4 with either maintaining the relative alignment of the longitudinal axis of the boat LAB with the longitudinal axis LAT of the associated trailer 6 or realigning the longitudinal axis of the boat LAB with the longitudinal axis LAT of the associated trailer 6 to facilitate accurate loading of the boat 4 on the trailer 6.

It is to be appreciated that the present disclosure is able to assist with fine tuning adjustment of the longitudinal axis of the boat LAB with the longitudinal axis LAT of the associated trailer 6. That is, according to the present disclosure, once the boat 4 is generally aligned with the desired trailer 6 upon which the boat 4 is to be loaded by visual alignment, thereafter, the navigational system and method 2 can maintain alignment of the longitudinal axis of the boat LAB with the longitudinal axis LAT of the associated trailer 6

Figures 8, 9:
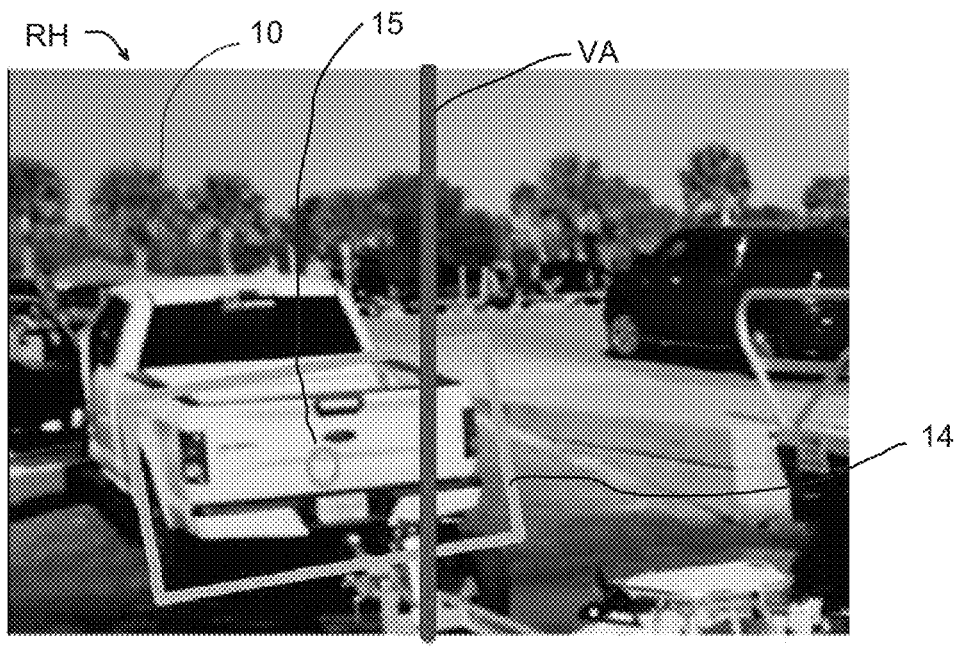
FIG. 8 is a diagrammatic representation of the navigation system and method, according to the disclosure, showing a central vertical (mid) axis of the camera located toward the right of a determined central target area (overlay) of the detected natural marker, associated with the tow vehicle, indicating that the boat longitudinal axis is misaligned with the longitudinal axis of the trailer so that turning of the boat toward the port (left) side is required in order to realign the boat longitudinal axis with the trailer longitudinal axis.
FIG. 9 is a diagrammatic representation of the navigation system and method, according to the disclosure, showing the central vertical (mid) axis of the camera generally aligned with the determined central target area (overlay) of the detected natural marker, associated with the tow vehicle, indicating that the boat longitudinal axis is aligned with the longitudinal axis of the trailer.

If the navigation system and method 2 determines, based on the currently processed image, that the target state is achieved, i.e., the middle line or central vertical (mid) axis VA of the camera 12 is aligned or coincident with the central area 15 of the target box (as shown in FIG. 9), then the longitudinal axis of the boat LAB is determined to be currently aligned with the longitudinal axis LAT of the associated trailer 6. As a result of such determination, the navigation system and method 2 will not indicate to the user that any corrective action is required.

Figure 11:
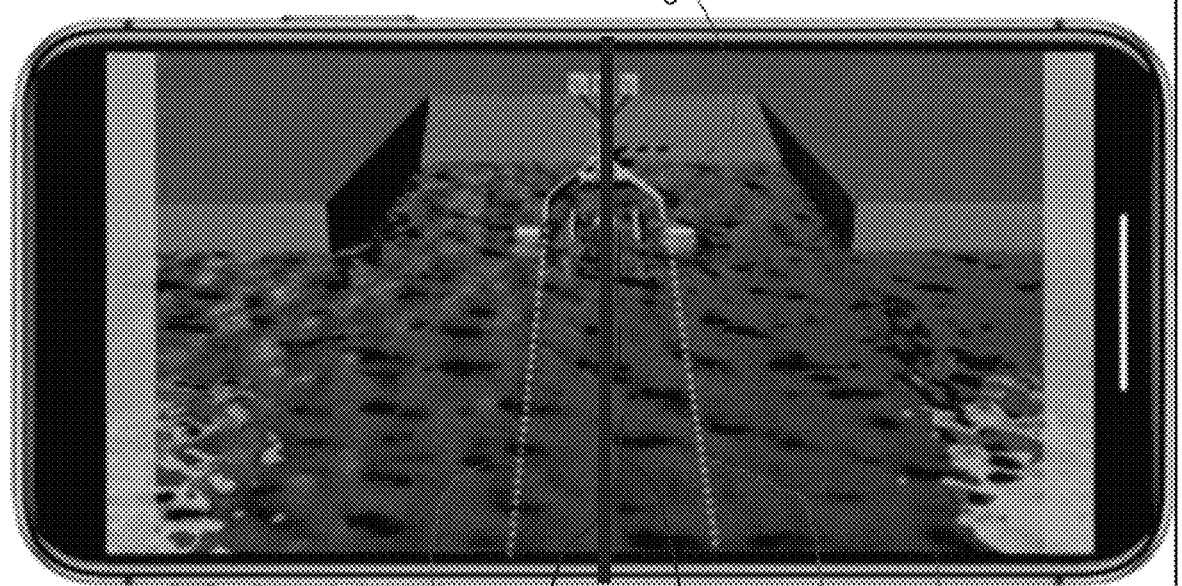
FIG. 11 is a diagrammatic representation of the navigation system and method with an image overlay, possibly highlighted in a second color (e.g., green), which indicates that the boat longitudinal axis is properly aligned with the trailer longitudinal axis boat.

In addition, the navigation system and method 2 may also display on the (main) display screen 24 of the mobile device 8 an indication of such accurate alignment to the user, e.g., by generating and displaying, on the (main) display screen 24 of the mobile device 8 signifying indicia, possibly 1) a pair of overlay left and right trajectory guides 28, 30 which both indicate that straight ahead continued travel of the boat 4 toward the trailer 6 is required, 2) a single (central axis) trajectory guide 29 which indicates that straight ahead continued travel of the boat 4 toward the trailer 6 is required, or 3) combination of both sets of trajectory guides, e.g., the left and the right trajectory guides 28, 30 as well as the single trajectory guide 29 (see FIG. 11). The trajectory guides 28, 29, 30 may possibly be colored "green", for example, to signify and/or reinforce that continued travel along the current boat loading trajectory is required.

However, in the event that the navigation system and method 2 determines, based on the currently processed image, that the target state is not achieved, i.e., the middle line or central vertical (mid) axis VA of the camera 12 is not sufficiently aligned or coincident with the target area overlay 15 contained within the target box overlay surrounding the natural marker NM (see FIG. 8), e.g., the boat 4 is headed toward a right side of the longitudinal axis LAT of the associated trailer 6, then corrective action is initiated. As a result of this determination, the navigational system and method 2 determines that the longitudinal axis of the boat longitudinal axis LAB is not aligned with the longitudinal axis LAT of the associated trailer 6. Based on such determination, the navigation system and method 2 generates a command signal indicating that corrective action is required and typically displays such corrective action on the (main) display screen 24 of the mobile device 8.

Figure 10:
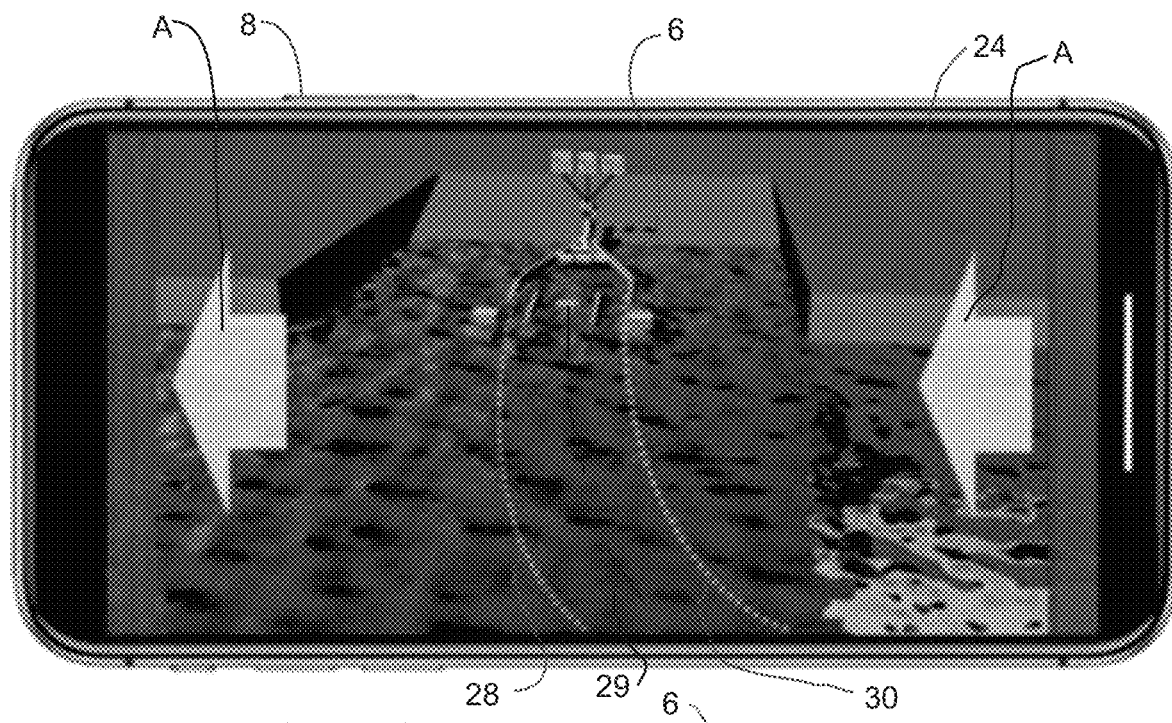
FIG. 10 is a diagrammatic representation of the navigation system and method with an image overlay, possibly highlighted in a first color (e.g., yellow or red), to indicate that turning (e.g., port side turning) action is required by the user in order to realign the boat longitudinal axis with the trailer longitudinal axis.

For example, the navigation system and method 2 may display on the (main) display screen 24 of the mobile device 8 any indication that turning of the boat 4 toward the port (left) side is required (see FIG. 10). For example, the display, on the (main) display screen 24 of the mobile device 8, may comprise one or more arrows A (or some other indicia) indicating the user that turning the boat 4 toward the port (left) side is required. Possibly, alternatively or in addition thereto, the navigation system and method 2 may display: 1) a pair of overlay left and right trajectory guides 28, 30 which both indicate that turning toward the port (left) side is required, 2) a single (central axis) trajectory guide 29 which indicates that turning toward the port (left) side is required, or 3) combination of both sets of trajectory guides, e.g., both the single trajectory guide 29 as well as the left and the right trajectory guides 28, 30 (see FIG. 10). The trajectory guides 28, 29, 30 may possibly be colored "yellow," "red" or some other color, or possibly a combination of colors, to signify that urgent corrective action is required in order to realign the boat longitudinal axis LAB with the longitudinal axis LAT.

In a similar manner, in the event that the navigation system and method 2 determines, based on the currently processed image, that the target state is not achieved, i.e., the middle line or the central vertical (mid) axis VA of the camera 12 is not sufficiently aligned or coincident with the target area overlay 15 of the target box overlay 14 (see FIG. 8), e.g., the boat 4 is headed toward a left side of the longitudinal axis LAT of the associated trailer 6. Accordingly, the longitudinal axis of the boat longitudinal axis LAB is determined not to be aligned with the longitudinal axis LAT of the associated trailer 6. As a result of such determination, the navigation system and method 2 will generate a command signal indicating that corrective action is required and typically display such corrective action on the (main) display screen 24 of the mobile device 8.

For example, the navigation system and method 2 may display on the (main) display screen 24 of the mobile device 8 any indication that turning of the boat 4 toward the starboard (right) side is required. The display, on the (main) display screen 24 of the mobile device 8, may comprise one or more arrows (or some other indicia) indicating the user to turn the boat 4 toward the starboard (right) side. Possibly in addition thereto, the navigation system and method 2 may display: 1) a pair of overlay left and right trajectory guides 28, 30 which both indicate that turning toward the starboard (right) side is required (not shown), 2) a single (central axis) trajectory guide 29 which indicates that turning toward the starboard (right) side is required, or 3) combination of both sets of trajectory guides, e.g., both the single trajectory guide 29 as well as the left and the right trajectory guides 28, 30. As noted above, the trajectory guides 28, 29, 30 may possibly be colored "yellow," "red" or some other color, or possibly a combination of colors, to signify that urgent corrective action is required in order to realign the boat longitudinal axis LAB with the longitudinal axis LAT of the trailer 6.

The navigation system and method 2 will repeat the above guidance process in order to maintain the longitudinal axis of the boat LAB in alignment with LAB with the longitudinal axis LAT of the trailer 6 until the boat 4 is safely loaded on the trailer 6. However, if during the guidance process, the navigation system and method 2 determines that the boat 4 cannot be safely loaded on the associated trailer 6, given the current alignment of the boat longitudinal axis LAB with the longitudinal axis LAT of the trailer 6, the navigation system and method 2 will then instruct/command the user to abort the current loading procedure, return back to the initial boat loading location and, thereafter, commence another attempt at loading the boat 4 on the associated trailer 6.

The navigation system and method 2 will continue providing the user with appropriate guidance output commands until the boat 4 is safely and efficiently loaded on the associated trailer 6 (see FIGS. 6, 7A and 7B). As soon as this occurs, the boat loading operation discontinues. Thereafter, the user may possibly attach the hook winch to the eye hook on the front of the boat 4 and crank the winch so as to pull the boat further onto the trailer 6. Then, the user or another person will enter the tow vehicle 10 and drive the tow vehicle 10 and boat 4 loaded on the trailer 6 away from the boat ramp and thereafter stop at a safe location to continue securing and readying the boat 4 for transport on the trailer 6.

During guidance by the navigation system and method 2, desired indicia is displayed on the display screen 24 ("guidance information") and/or audio/heptic guidance output commands ("guidance information") may be generated and sent to a speaker (now shown in detail) of the mobile device 8 which communicates with the image processing unit 32 so as to provide turning information/instructions/commands to the user during the unloading/loading process.

During the loading or unloading operation of the boat 4, typically the boat 4 is moving at a relatively slow but constant speed, e.g., 1-6 knots per hour and more preferably about 1-3 knots per hour, toward the associated trailer 6. At the same time, the camera 12 is constantly and continuously generating and sending images to the image processing unit 32 of the navigation system 2 for processing.

If desired, the image processing unit 32 may be provided with a time filtering module which is able to filter the processing of the images in order to reduce the effects of waves on the navigation system 2. It is to be appreciated that waves will lead to an oscillating position of the boat 4, relative to the associated trailer 6 and the tow vehicle 10 which form the natural marker NM. Such oscillations can be filtered out by a time filtering module in order to assist with improving the accuracy of the navigation system and method 2.

If desired, the navigation system and method 2 may also be utilized to record a loading process of the boat 4, when the boat 4 is located at a desired distance away from the trailer 6, for example, 20 to 200 feet or so. During such loading operation, as the boat commences its approach toward the trailer 6, the natural marker NM is located within the field of view FOV of the camera 12. The navigation system and method 2 continues recording the boat loading process until the boat is completely loaded on the associated trailer 6. Eventually, a bottom surface of the boat 4 engages with the bunks/rollers of the associated trailer 6, and the boat 4 becomes primarily supported by the trailer 6, at which point in time, the recording process may be discontinued. Thereafter, the navigation system and method 2 can then utilize this recorded information to assist with proper loading of the boat 4 on the associated trailer 6, as generally discussed above.

It is to be appreciated that the navigation system and method 2, according to the disclosure, can generate one or more warning sounds, warning lights and/or warning signals which may be periodically emitted, during operation of the navigation system and method 2, to assist the operator with safely and efficiently loading the boat onto the associated trailer 6. For example, a warning signal(s) and/or vibrational (s) may be emitted by the navigation system and method 2 in the event that speed of the boat is determined to be too fast for safely loading the boat on the associated trailer 6 or the natural marker NM is no longer within the field of view FOV of the camera 12. In the event that the navigation system and method 2 determines that, given the current alignment of the boat 4 with the trailer 6 (e.g., the natural marker NM is no longer in the field of view FOV of the camera 12), it will not be possible for the longitudinal axis LAB of the boat to become properly aligned with the longitudinal axis LAT of the trailer (, a "FAILED" message may be delivered to the user alone or in combination with one or more other appropriate warning sounds, warning lights and/or warning signals. In response to such warnings or failed message, the operator will then have to undertake drastic corrective action, e.g., rapidly slow down the travel speed of the boat 4, or possibly reverse the travel direction of the boat 4, in order to avert possible damage to the boat 4 and/or trailer 6 and, thereafter, restart the boat loading process again.

For acoustical guidance, the navigation system and method 2 can generate an acoustical signal which informs the user, due to frequency and/or tempo of the acoustical signal which is proportional to the distance the boat is from the trailer 6 and/or the relative alignment of the longitudinal axis of the boat LAB to the longitudinal axis LAT of the associated trailer 6 (similar to existing car parking sensors and their associated audible indicators). For example, the closer the boat 4 is located to the trailer 6, the frequency and/or tempo of the acoustical signal may increase to indicated the same to the user. Alternatively or in addition, the navigation system and method 2 can provide haptic guidance, e.g., generates a vibration signal, which increases in frequency and/or tempo the closer the boat 4 is located to the trailer 6.

It is to be appreciated that the navigation system and method 2 may possibly operate as an autonomous boat loading navigational system and method 2. In particular, the navigation system and method 2 can be linked with the engine control unit so as to receive throttle and steering information from the boat 4 and to send at least one of throttle and/or steering commands to the engine control unit and thereby autonomously load the boat 4 on the trailer 6, according to the process generally discussed above. The App will the assist the user with repositioning the boat 4 back to the same GPS coordinates, which were previously saved by the navigational system and method 2 upon termination of recording function, and with the boat 4 facing and headed in the direction toward the trailer 6 for loading. Thereafter, the user will actuate the autonomously loading feature of the navigation system and method 2 which operates to automatically load the boat 4 on the trailer 6 in the manner described above.

While the navigation system and method 2 for a boat is described above, it is to be appreciated that the principles of this disclosure are directly applicable and can be utilized for other applications, e.g., to assist with loading a large construction equipment or a vehicle onto an associated trailer 6.

In view of this, the term "vehicle," as employed within this disclosure and the accompanying claims, is intended to mean and be construed to include any type of boat, vessel, piece of heavy equipment, vehicle, etc., which may be loaded on an associated trailer 6 and transported from one location to another location.

Inasmuch as the invention is subject to variations and improvements, it is intended that the foregoing shall be interpreted as merely illustrative of a presently preferred forms of the invention defined by the following claims.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a imitative sense.

We claim:

1. A navigation system for guiding a boat onto a trailer, the navigation system comprising:
   at least a portion of one of a tow vehicle forming a natural marker of the navigation system to assist the navigation system with loading the boat onto the trailer;
   a camera being located on the boat to assist the navigation system with aligning a longitudinal axis of the boat with a longitudinal axis of the trailer, a central vertical (mid) axis of the camera being aligned with the longitudinal axis of the boat, and the camera being located so as to generate images of at least the tow vehicle, during a boat loading process, for detection of the natural marker;
   an image processing unit, coupled to the camera, for receiving and processing the images from the camera and scanning the images for detecting the natural marker, and, upon detecting the natural marker, determining a target area of the detected natural marker, and the image processing unit then determining whether or not the central vertical (mid) axis of the camera is substantially coincident with the target area of the detected natural marker; and
   the image processing unit, based upon the determined position of the central vertical (mid) axis of the camera relative to the target area of the detected natural marker, generating guidance commands to assist a user with alignment of the longitudinal axis of the boat with the longitudinal axis of the trailer and thereby facilitate loading of the boat on the trailer.

2. The navigation system according to claim 1, wherein the generated guidance commands, provided by the image processing unit, comprises at least one of:
a display screen, communicating with the image processing unit, for displaying generated images of the camera to the user; and/or
one of a speaker and a vibrational device, communicating with the image processing unit, for generating guidance output commands to the user, during the boat loading operation, to assist the user with loading the boat on the trailer.

3. The navigation system according to claim 1, wherein the camera is mounted, via a camera bracket, to the boat vertically above a top perimeter edge of a bow of the boat and along the longitudinal axis of the boat.

4. The navigation system according to claim 1, wherein, during initial set-up of the camera, a user adjusts the camera, relative to the longitudinal axis of the boat, so that the central vertical (mid) axis of the camera, which divides a field of view of the camera into equal left and right halves, is generally coincident with the longitudinal axis of the boat.

5. The navigation system according to claim 1, wherein the camera is equipped with image stabilizing technology which minimizes effects of wave action being experienced by the boat during the boat loading process.

6. The navigation system according to claim 1, wherein, prior to loading the boat onto the trailer, the trailer is positioned on the boat loading ramp so that the longitudinal axis of the trailer is substantially aligned with the longitudinal axis of the tow vehicle to facilitate use of the navigation system.

7. The navigation system according to claim 1, wherein the navigation system includes a target box overlay which defines features of at least the tow vehicle which are to comprise the natural marker.

8. The navigation system according to claim 1, wherein the navigation system generates a camera central vertical (mid) axis overlay and a target area overlay for display on the image currently displayed by the display screen so as to provide the user with a visual indication of a current alignment of the longitudinal axis of the boat with the longitudinal axis of the trailer.

9. The navigation system according to claim 1, wherein the camera is located so that the camera will continuously generate picture frames or images, during the boat loading process, and the central vertical (mid) axis of the camera is one of coincident with the longitudinal axis of the boat and offset from the longitudinal axis of the boat.

10. The navigation system according to claim 7, wherein the camera has an adjustment feature which permits an overall size of the target box overlay to be increased or decreased in size and thereby to increase or decrease an amount of features that comprise the natural marker for scanning and subsequently identification by the navigation system as the natural marker.

11. The navigation system according to claim 1, wherein the camera is located at a vantage point vertically above a top perimeter edge of a bow of the boat and adjacent a helm of the boat to facilitate viewing of at least the tow vehicle, a loading area of the trailer and water located between the boat and the trailer.

12. The navigation system according to claim 11, wherein one of:
the camera is an integrated camera of a mobile device, and the image processing unit is incorporated into the mobile device; or
the camera is a wireless camera which communicates wirelessly with the image processing unit.

13. The navigation system according to claim 12, wherein the mobile device is releasably mounted, via a camera bracket, to the boat adjacent the longitudinal axis of the boat to facilitate viewing of the boat loading operation, and the camera bracket supports a perimeter edge of the mobile device, without blocking or hindering a field of view of the integrated camera of the mobile device or viewing of a rear display screen of the mobile device by the user.

14. The navigation system according to claim 11, wherein the camera is a wireless camera which communicates wirelessly with a mobile device, and the wireless camera is mounted to the boat, along the longitudinal axis of the boat, to facilitate viewing of the boat loading operation.

15. The navigation system according to claim 11, wherein the camera is mounted to the boat, offset with respect to the longitudinal axis of the boat, to facilitate viewing of the boat loading operation.

16. The navigation system according to claim 1, wherein the navigation system further comprises means for producing a warning signal or command, when the longitudinal axis of the boat becomes misaligned with the longitudinal axis of the trailer, to indicate that corrective action by the use is required.

17. The navigation system according to claim 16, wherein the warning signal or command is one of an optical signal, an acoustical signal, or a haptic signal.

18. The navigation system according to claim 17, wherein a frequency and/or a tempo of the acoustical signal or the haptic signal increases when drastic corrective action is required by the user.

19. The navigation system according to claim 1, wherein the navigation system and method comprises an autonomous boat loading navigational system for autonomously loading the boat on the trailer.

20. A method of guiding a boat onto a trailer, the method comprising:
using at least a portion of one of at least a tow vehicle to form a natural marker of a navigation system and assist the navigation system with loading the boat onto the trailer;
locating a camera on the boat to assist the navigation system with aligning a longitudinal axis of the boat with a longitudinal axis of the trailer, aligning a central vertical (mid) axis of the camera with the longitudinal axis of the boat, and locating the camera so as to generate images of at least one of the tow vehicle and the trailer, during a boat loading process, to assist with detecting the natural marker;
coupling an image processing unit to the camera for receiving and processing images from the camera and scanning for the natural marker and, upon the image processing unit detecting the natural marker, determining a target area of the detected natural marker, and then the image processing unit determining whether or not a position of the central vertical (mid) axis of the camera is coincident with the target area of the detected natural marker; and
based upon the determined position of the central vertical (mid) axis of the camera relative to the target area of the detected natural marker, the image processing unit generating guidance commands to assist a user with aligning the longitudinal axis of the boat with the longitudinal axis of the trailer.

* * * * *